Aug. 14, 1934.    S. F. WALTON    1,970,529
TURBULENT RADIANT COMBUSTION CHAMBER
Filed April 8, 1932    2 Sheets-Sheet 1

Inventor
Samuel F. Walton
By Ellis Spackr.
Attorney

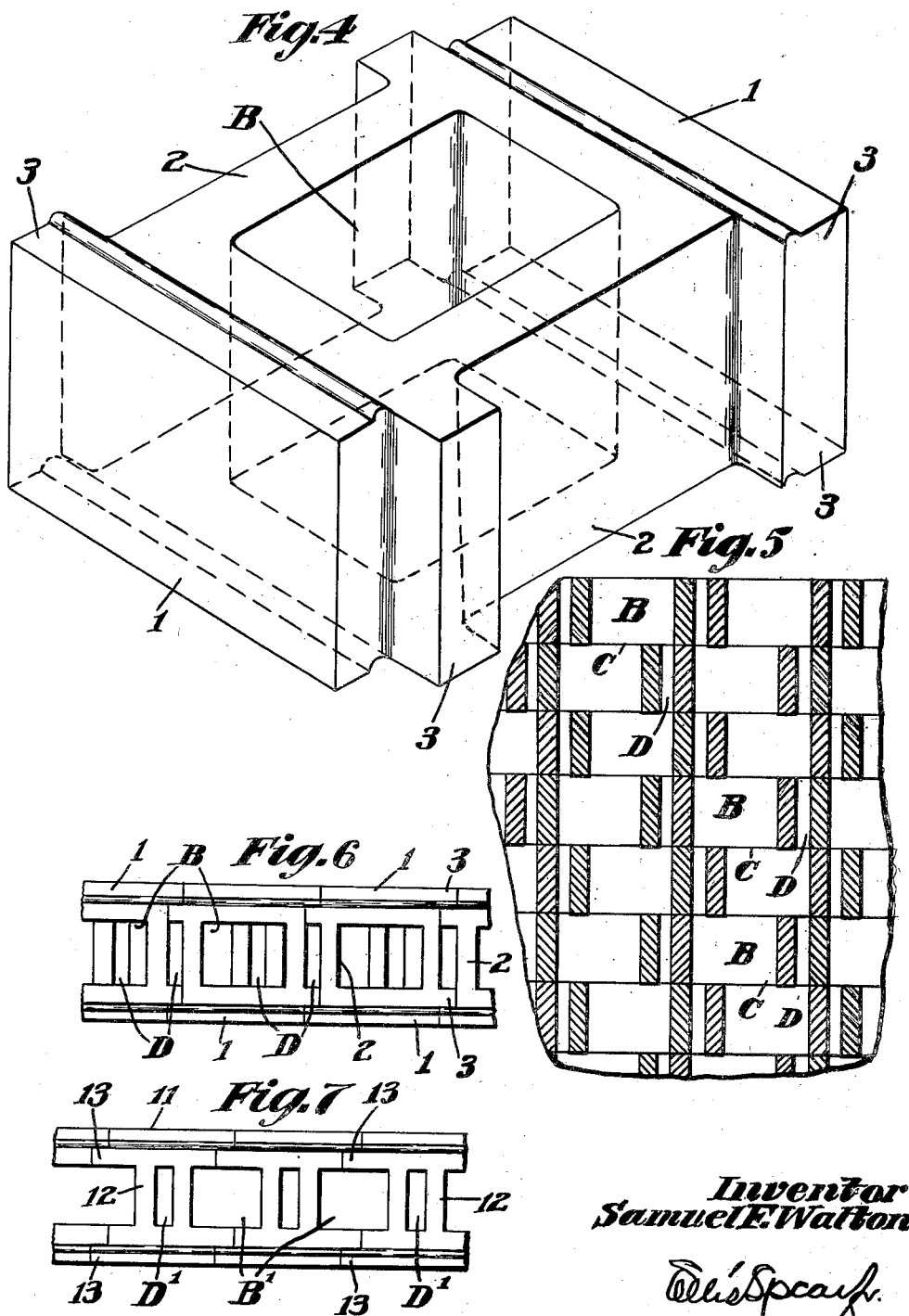

Patented Aug. 14, 1934

1,970,529

UNITED STATES PATENT OFFICE 1,970,529

TURBULENT RADIANT COMBUSTION CHAMBER

Samuel F. Walton, Hamburg, N. Y., assignor to The Exolon Company, Blasdell, N. Y., a corporation of Massachusetts Application April 8, 1932, Serial No. 604,036

3 Claims. (Cl. 158—1)

This invention relates to combustion chambers and particularly those of radiant character in which a maximum efficiency of combustion of gases or gaseous fuel is obtained.

It is well known that the contact of gaseous fuel mixtures with a radiant body and the intimate mixing of gaseous combustible matter with the oxygen are important factors in getting complete combustion.

The utilization of the indirect heat from the outer surface of a radiant body or structure also aids greatly in efficiency of obtaining maximum heat energy from the combustion of the fuel.

My invention contemplates structures and principles by which all these advantages are attained and according to my concept the known phenomena are combined and made possible on an extremely simple basis of construction and operation.

By providing for a succession of changes in velocities and by alternate expansion and compressions, I obtain turbulent effects which intimately mix the oxygen of combustion with the combustion gas in extended contact with radiant surfaces which are brought to and maintained at highly efficient temperatures. To this end I also contemplate the efficient use of certain materials capable of becoming radiant when heated as will be later discussed and am able to provide a unitary basis by which varied structural needs may be met.

The various features of my invention will be considered in connection with an illustrative turbulent radiant structure shown in the accompanying drawings. This is only a simple characteristic embodiment intended to be suggestive, to those skilled in the art, of the great variety of modifications that can be and will be made for different installations. In the drawings:—

Fig. 4 is a view of one form of unit in accordance with my invention suitable to be used as in Figs. 1, 2 and 6 and 7.

Fig. 5 is a view comparable to a central part of Fig. 1, but showing a modification.

Fig. 6 is a plan view of units of the type shown in Fig. 4 according to Figs. 1 and 2, and Fig. 7 is a similar view of an assembly of units of modified form.

Figure 1:
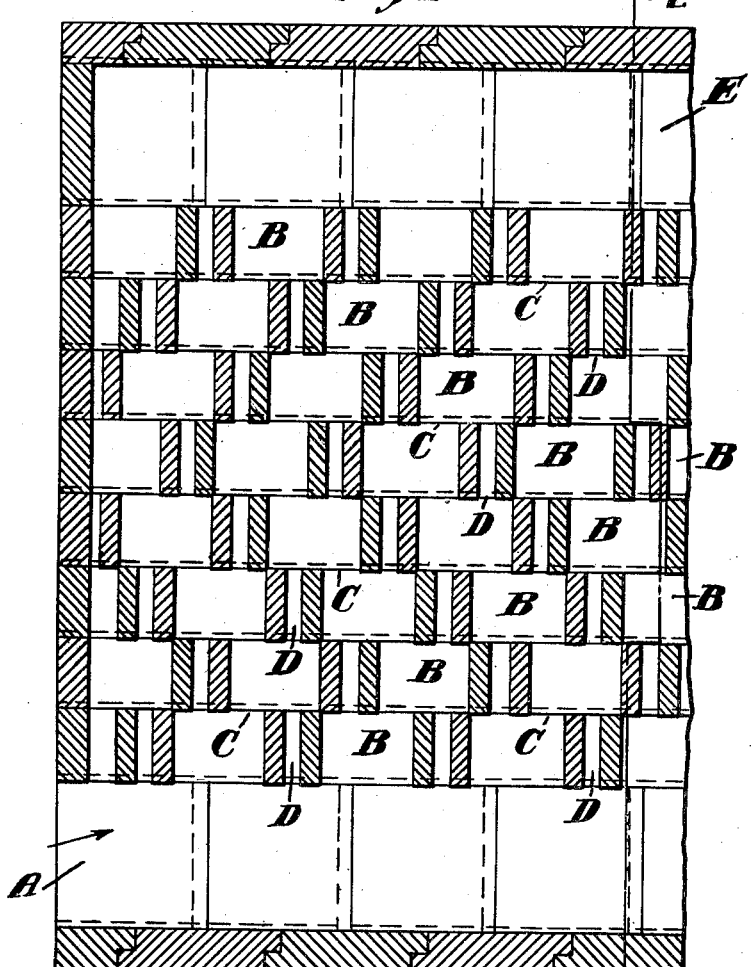
Fig. 1 is a longitudinal section through a portion of a turbulent radiant combustion chamber in accordance with my invention.
Figure 2:
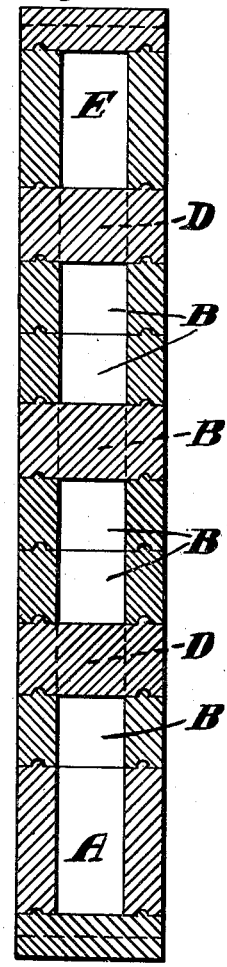
Fig. 2 is a transverse section on the line 2—2, of Fig. 1.

In the embodiment shown, the combustible mixture is admitted into the inlet flue A at the left of Fig. 1 and passes upward through a series of sub-combustion or plenum chambers B fed by communicating inlets C and D. In these the effective opening of C has a cross section twice that of the opening D so that these combined areas give an unbalanced cross section of varied turbulent effect on the gas flow into B.

Figure 3:
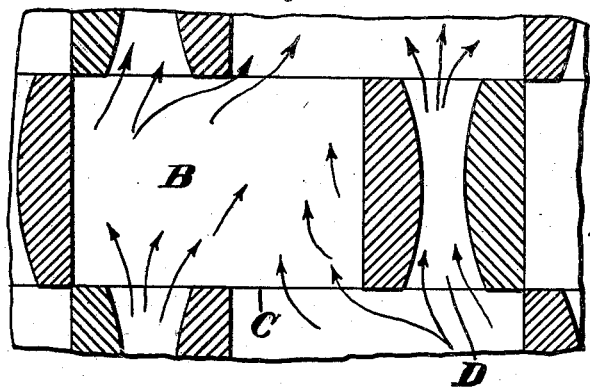
Fig. 3 shows a modified manner of constructing and laying the units.

As shown in Fig. 3, the inlet passages D may provide graduated central constrictions between the sub-chambers or plenum capacities which they connect. The gases are compressed in their transit of D and their velocity increased. The discharge of C while exerting contraction and compression prior to expansion, is more turbulent.

The gaseous products of combustion pass to an outlet flue E, if desirable, or such may be omitted and the top of the combustion zone left open.

The disposition of the inlet and outlet connection or flues, which may be straight or tapered, may be horizontal or vertical, and the trend or drift of the gases varied accordingly. As will be explained later, this is a simple matter in accordance with my concept by a laying of the units in proper relation or in relatively proportioning the same.

As shown in Fig. 1, the number 1, number 2 and number 3 courses give a zigzag effect. The drift starts at the number 2 course to trend left shifting at courses 6 to 9 to drift to the right.

In Fig. 5 I have illustrated what may be termed an alternate zigzag which provides for further variations in the arrangement of the sub-chambers and connecting passages.

The units may be conveniently molded in the hollow form shown in Fig. 4 and laid end to end in courses as in Fig. 6. In this form, the chamber B is enclosed by side walls 1 connected by cross webs or end walls 2 leaving projecting flanges 3 which are staggered at opposite ends to interlock, leaving the restricted passages D between the ends of adjacent units.

In the form shown in the plan view Fig. 7 the units are formed in general H shape. The side walls 11 are connected by a pair of central cross webs 12 the ends of the side walls being alternately flanged as at 13 to interlock and make a tight joint across the sub-chambers $B^1$.

Refractory materials of relatively high thermal conductivity lend themselves to the making of such a combustion chamber as constitutes my invention as the outer surface will more quickly arrive at a temperature which gives off radiant heat. Assuming that a fire clay refractory has a thermal conductivity of 1, other refractory materials can be listed in the order of their relative conductivity, silica 5, alumina 7, silicon carbide 9. Bonded silicon carbide may be used as the refractory, and it would be obvious to one skilled in the art to use such a material where quick radiant temperature of the outer surface of the chamber is desired.

However, refractory materials having high thermal conductivity have low thermal capacity. Fire clay refractories have high thermal capacity. A greater amount of heat is needed to bring the body to radiant heat, but such a body cools more slowly. When a fire clay body has reached the state of giving off radiant heat at the desired rate from the outer surface, little more energy is required to maintain the radiant temperature than is required to maintain a like condition in a body composed of a refractory having a high thermal conductivity. This has led to the preferred use in my invention of a refractory composed of silicon carbide, alumina and fire clay. This refractory body will more quickly reach a desired high temperature than a fire clay body, but not as quickly as a body composed principally of silicon carbide; but it will give off from the outer surface as much heat as, and be more effective in promoting combustion than the inner surface, with which the combustion gases are in contact; will be at a slightly higher temperature than would be, under like conditions of heat reception, a body composed principally of silicon carbide; and the heat required to maintain the temperature equilibrium will be little or no more than that required when the body is composed principally of silicon carbide; and last, the outer surface will retain a radiant temperature longer, that is, will not cool as quickly as if the body were composed principally of silicon carbide. Obviously a bonded alumina refractory may be used as a substitute for the preferred refractory.

As an example of my preferred refractory body for my units, I use a mixture of 50% silicon carbide, 40% fused alumina, and 10% clay; or I may use a mixture composed of 50% silicon carbide, 39% fused alumina and 11% bond. Either one of these bodies when formed into the desired refractory shape will show a fairly high thermal conductivity and a higher thermal capacity than a body containing say 92% silicon carbide and 8% clay, such a body being composed principally of silicon carbide.

Bonded silicon carbide has a thermal conductivity of .0231 gram calories at 1000° C. and a specific heat of approximately 0.185. The preferred body given above has a thermal conductivity of approximately .015 and a specific heat of about 0.230. Bonded alumina has a thermal conductivity of .0083 gram calories and a specific heat of .279. A fire clay body has a thermal conductivity of .00339 and a specific heat of 0.265.

It can be readily seen that the preferred body has a lower thermal conductivity than bonded silicon carbide, but a higher thermal capacity. Either preferred body is developed to be substantially impervious to gases. The second body is unusually satisfactory in regard to gas permeation. It can be readily seen that impermeability of the body is of paramount importance in the successful use of this radiant body.

While these refractory bodies are indicated as preferred, bonded alumina or other refractory mixes may be used in making my units.

What I therefore claim and desire to secure by Letters Patent is:—

1. A radiant surfaced structure having inlet and outlet draft connections and comprising superimposed courses of recessed refractory units consisting of radiant side walls and connecting transverse web laid up to define in the successive courses series of relatively staggered combustion sub-chamber the web portions of the courses partially blocking the top and bottom sides of the adjacent chambers but leaving restricted passages communicating between successive chambers which passages discharge into the sub-chambers to effect turbulent expansion therein.

2. A radiant surfaced structure having inlet and outlet draft connections and comprising superimposed courses of hollow refractory units, consisting of radiant side walls and connecting transverse webs laid up intermediately to define in the successive courses series of relatively staggered combustion sub-chambers, the web portions of the courses partially blocking the top and bottom sides of the adjacent chambers but providing spaced restricted passages of centrally reduced cross sections communicating between successive chambers which passages discharge into the sub-chambers to effect turbulent expansion therein.

3. A combustion chamber unit adapted to be laid up in assembly in a radiant structure, comprising a hollow refractory article consisting of side and end walls and including an interior expansion chamber and a by-pass adapted to effect a connection between adjacent expansion chambers when assembled in staggered relation with like units thereabove and therebelow.

SAMUEL F. WALTON.